US012789562B2

(12) United States Patent
Wan et al.

(10) Patent No.: US 12,789,562 B2
(45) Date of Patent: Nov. 10, 2026

(54) TRAILER CONNECTION DEVICE WITH AUTOMATIC HEIGHT POSITIONING

(71) Applicant: Hangzhou Ruishang Hardware Co., Ltd., Hangzhou (CN)

(72) Inventors: Xuehua Wan, Hangzhou (CN); Huili Yan, Hangzhou (CN); Quanmei Sun, Hangzhou (CN)

(*) Notice: Subject to any disclaimer, the term of this patent is extended or adjusted under 35 U.S.C. 154(b) by 141 days.

(21) Appl. No.: 19/024,193

(22) Filed: Jan. 16, 2025

(65) Prior Publication Data

US 2026/0184124 A1 Jul. 2, 2026

(30) Foreign Application Priority Data

Dec. 31, 2024 (CN) ......................... 202423295417.3

(51) Int. Cl.
*B60D 1/46* (2006.01)
*B60D 1/06* (2006.01)
*B60D 1/52* (2006.01)

(52) U.S. Cl.
CPC ................. *B60D 1/46* (2013.01); *B60D 1/06* (2013.01); *B60D 1/52* (2013.01)

(58) Field of Classification Search
CPC ... B60D 1/42; B60D 1/44; B60D 1/46; B60D 1/06; B60D 1/07; B60D 1/075; B60D 1/36; B60D 1/54
USPC ................. 403/322.2, 379.1; 280/490.1, 511
See application file for complete search history.

(56) References Cited

U.S. PATENT DOCUMENTS

| | | | | |
|---|---|---|---|---|
| 4,076,273 A * | 2/1978 | Campion | A01B 59/043 | 280/490.1 |
| 7,451,996 B2 * | 11/2008 | Miles | B60D 1/46 | 280/495 |
| 8,979,112 B2 * | 3/2015 | Weipert | B60D 1/07 | 280/491.5 |
| 9,457,631 B1 * | 10/2016 | Kennemer | B60D 1/06 | |
| 9,844,986 B2 * | 12/2017 | Harper | B60D 1/28 | |
| 12,172,479 B1 * | 12/2024 | Jian | B60D 1/46 | |
| 12,528,322 B1 * | 1/2026 | Chen | B60D 1/46 | |
| 2012/0217724 A1 * | 8/2012 | Works | B60D 1/52 | 280/490.1 |
| 2021/0370730 A1 * | 12/2021 | Pennington | B60D 1/54 | |
| 2024/0140148 A1 * | 5/2024 | Tang | B60D 1/241 | |
| 2025/0018753 A1 * | 1/2025 | Shaffer | B60D 1/06 | |
| 2026/0138404 A1 * | 5/2026 | Taylor | B60D 1/54 | |

* cited by examiner

*Primary Examiner* — Anne Marie M Boehler

(57) ABSTRACT

A trailer connection device with automatic height positioning, comprising a main shank, first pin holes arranged on the main shank, an adjustable shank perpendicular to the main shank and fixedly arranged thereon, two slide grooves symmetrically arranged on both sides of the adjustable shank, a plurality of second pin holes arranged on the adjustable shank, and a trailer connection mechanism movably arranged on the adjustable shank; the trailer connection mechanism comprises a ball mount tongue movably arranged on the two slide grooves, a plurality of third pin holes symmetrically arranged on the ball mount tongue, a plurality of automatic positioning grooves arranged on the adjustable shank, a clearance groove arranged in the ball mount tongue, a positioning ball movably arranged in the clearance groove, a spring with two ends respectively fixed on the clearance groove and the positioning ball, and a connecting assembly arranged on the ball mount tongue.

9 Claims, 4 Drawing Sheets

TRAILER CONNECTION DEVICE WITH AUTOMATIC HEIGHT POSITIONING

1. TECHNICAL FIELD

The invention relates to the technical field of vehicle auxiliary accessories, in particular to a trailer connection device with automatic height positioning.

2. BACKGROUND ART

A trailer connection device is a specialized device used to connect a tractor and a trailer, ensuring safe and reliable linkage between them. It is primarily used for connecting and towing trailers, malfunctioning vehicles, etc. In the existing dual-ball trailer connection device, when adjusting the height of the ball mount tongue, the pin hole on the ball mount tongue and the pin hole on the connecting shank often require multiple attempts to align perfectly, making usage cumbersome. Now, a trailer connection device with automatic height positioning is adopted, which can automatically position the height of the ball mount tongue, enabling the pin hole on the ball mount tongue to align with the pin hole on the connecting shank automatically. This makes height adjustment convenient and efficient.

3. SUMMARY OF THE INVENTION

The content of this invention is used to introduce concepts in a brief form, which will be described in detail in the specific embodiment below. The content of this invention is not intended to identify the key features or essential features of the technical solution claimed for protection, nor is it intended to limit the scope of the technical solution claimed for protection.

To address the technical problems mentioned in the background art above, some embodiments of this invention provide a trailer connection device with automatic height positioning, comprising a main shank, first pin holes arranged on the main shank, an adjustable shank perpendicular to the main shank and fixedly arranged thereon, two slide grooves symmetrically arranged on both sides of the adjustable shank, a plurality of second pin holes arranged on the adjustable shank, and a trailer connection mechanism movably arranged on the adjustable shank, wherein the trailer connection mechanism comprises a ball mount tongue movably arranged on the two slide grooves, a plurality of third pin holes symmetrically arranged on the ball mount tongue, a plurality of automatic positioning grooves arranged on the adjustable shank, a clearance groove arranged in the ball mount tongue, a positioning ball movably arranged in the clearance groove, a spring with two ends respectively fixed on the clearance groove and the positioning ball, and a connecting assembly arranged on the ball mount tongue; the plurality of second pin holes are arranged linearly and equidistantly; each automatic positioning groove is arranged between two adjacent second pin holes; the plurality of automatic positioning grooves correspond one to one with the plurality of second pin holes.

Specifically, the connecting assembly comprises a through hole arranged on the ball mount tongue, a dual ball detachably arranged in the through hole, and a fastening hoop arranged on the ball mount tongue for fixing the dual ball.

Specifically, the dual ball comprises two trailer hitch balls respectively arranged on both sides of the ball mount tongue, a support rod with two ends respectively fixed on the two trailer hitch balls, a limit plate fixed on the support rod, and a locking edge groove arranged on the support rod.

Specifically, the locking edge groove is symmetrically provided with two first planes.

Specifically, the fastening hoop comprises a right hoop arranged on the ball mount tongue and a left hoop arranged on the ball mount tongue; the right hoop and the left hoop have the same structure; the right hoop comprises a right hoop body, screw holes arranged on the ball mount tongue, fastening bolts detachably arranged on the ball mount tongue and cooperating with the screw holes, bolt head holes arranged on the right hoop body, and two second planes symmetrically arranged on the right hoop body.

Specifically, the two second planes are arranged in cooperation with the two first planes.

Specifically, a reinforcing rib is arranged at a connection between the main shank 1 and the adjustable shank.

Specifically, one end of the adjustable shank is provided with an inclined surface.

Specifically, the ball mount tongue is provided with a step; the height of the step is the same as the thickness of the right hoop body.

The invention has the following advantageous effects:

(1) when using this trailer connection device, insert the main shank into a quick-connect square opening of the trailer and secure it with pins; move the ball mount tongue to match the height of a tractor; position the positioning ball into one of the automatic positioning grooves to initially secure the ball mount tongue; align the third pin holes on the ball mount tongue with the two second pin holes on the adjustable shank, and secure the ball mount tongue with pins; connect the two trailer hitch balls o the tractor, thus linking the tractor and the trailer; by using this trailer connection device, the third pin holes on the ball mount tongue can automatically align with the second pin holes on the adjustable shank, facilitating the adjustment of the height of the ball mount tongue and completion of the fixation.

4. BRIEF DESCRIPTION OF ACCOMPANYING DRAWINGS

The accompanying drawings constituting a part of this invention are used to provide a further understanding of this invention, so that other features, objects and advantages of this invention become more obvious. The accompanying drawings and descriptions of the schematic embodiments of this invention are used to explain this invention and do not constitute an improper limitation on this invention.

In addition, throughout the accompanying drawings, the same or similar reference numerals represent the same or similar elements. It should be understood that the accompanying drawings are schematic, and the elements and components are not necessarily drawn to scale.

5. SPECIFIC EMBODIMENT OF THE INVENTION

Figure 1:
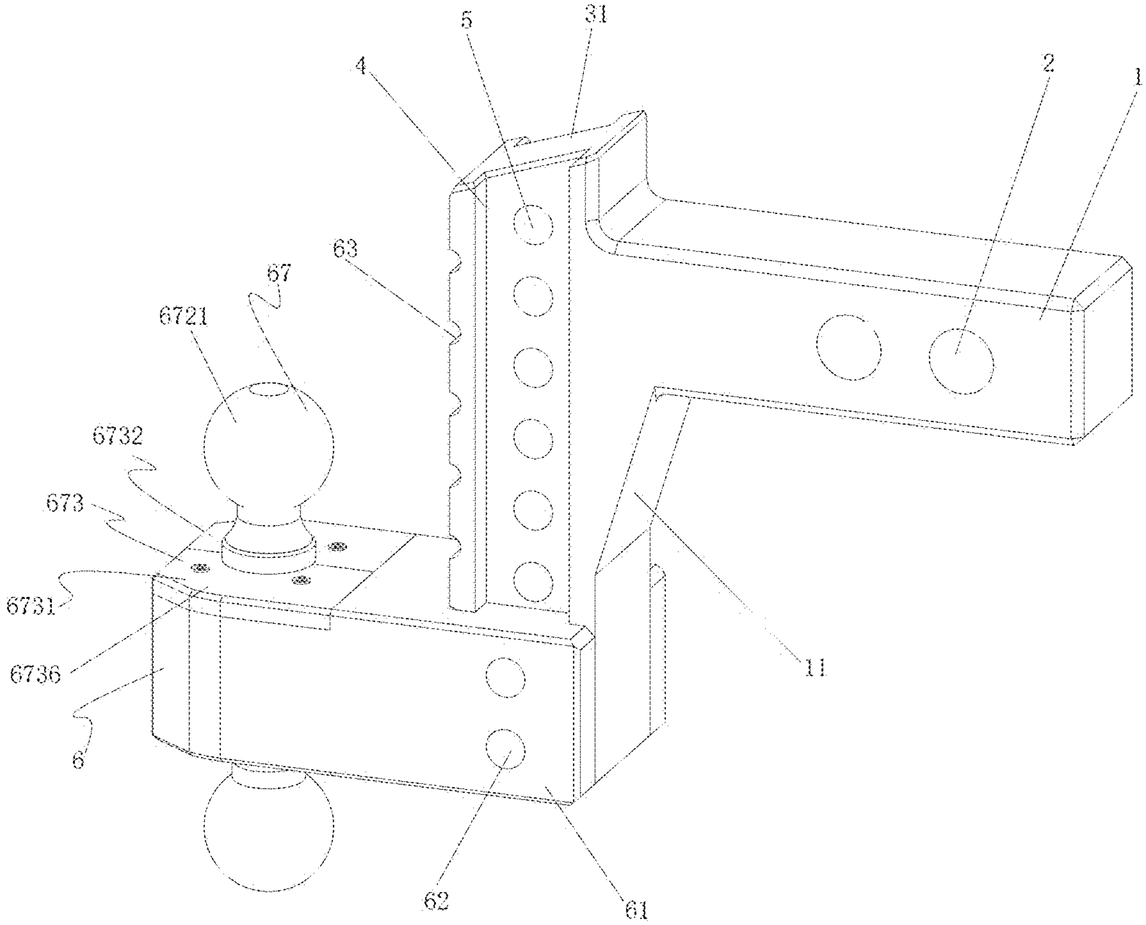
FIG. 1 is a schematic diagram of the structure of the invention.

The embodiments of the invention will be described in more detail below with reference to the accompanying drawings. Although certain embodiments of the invention are shown in the accompanying drawings, it should be understood that the invention can be implemented in various forms and should not be interpreted as being limited to the embodiments described herein. On the contrary, these embodiments are provided to provide a more thorough and complete understanding of the invention. It should be understood that the drawings and embodiments of the invention are only for exemplary purposes and are not intended to limit the protection scope of the invention.

It should also be noted that, for the convenience of description, only the parts related to the invention are shown in the drawings. The embodiments and features in the embodiments of the invention can be combined with each other without conflict.

It should be noted that the concepts of "first", "second", etc. mentioned in this invention are only used to distinguish different devices, modules or units, and are not used to limit the order or interdependence of the functions performed by these devices, modules or units.

It should be noted that the modifications of "one" and "multiple" mentioned in the invention are illustrative rather than restrictive. Those skilled in the art should understand that unless otherwise clearly indicated in the context, it should be understood as "one or more".

The invention will be described in detail with reference to the accompanying drawings and in combination with the embodiments.

Figure 2:
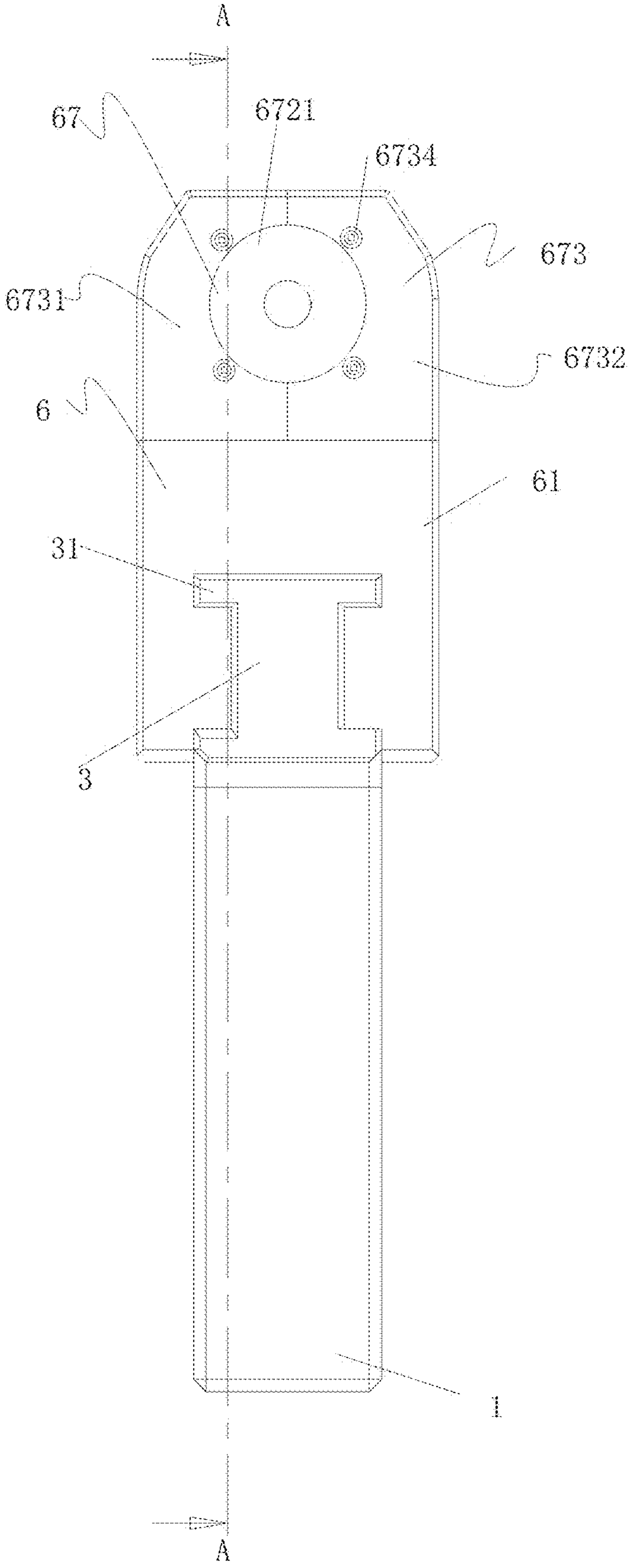
FIG. 2 is a side view of the invention.
Figure 3:
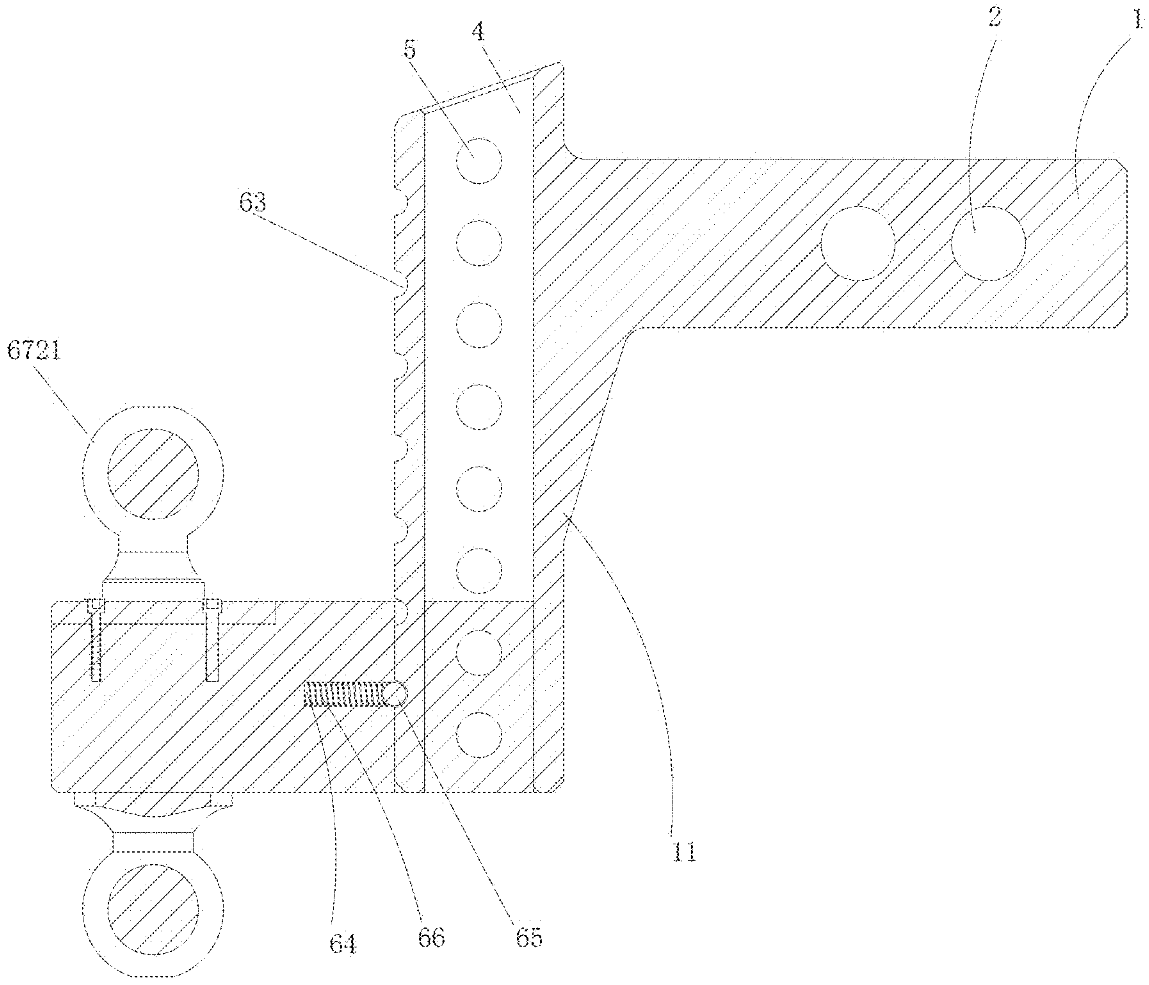
FIG. 3 is a sectional view of the A-A line of FIG. 2.
Figure 4:
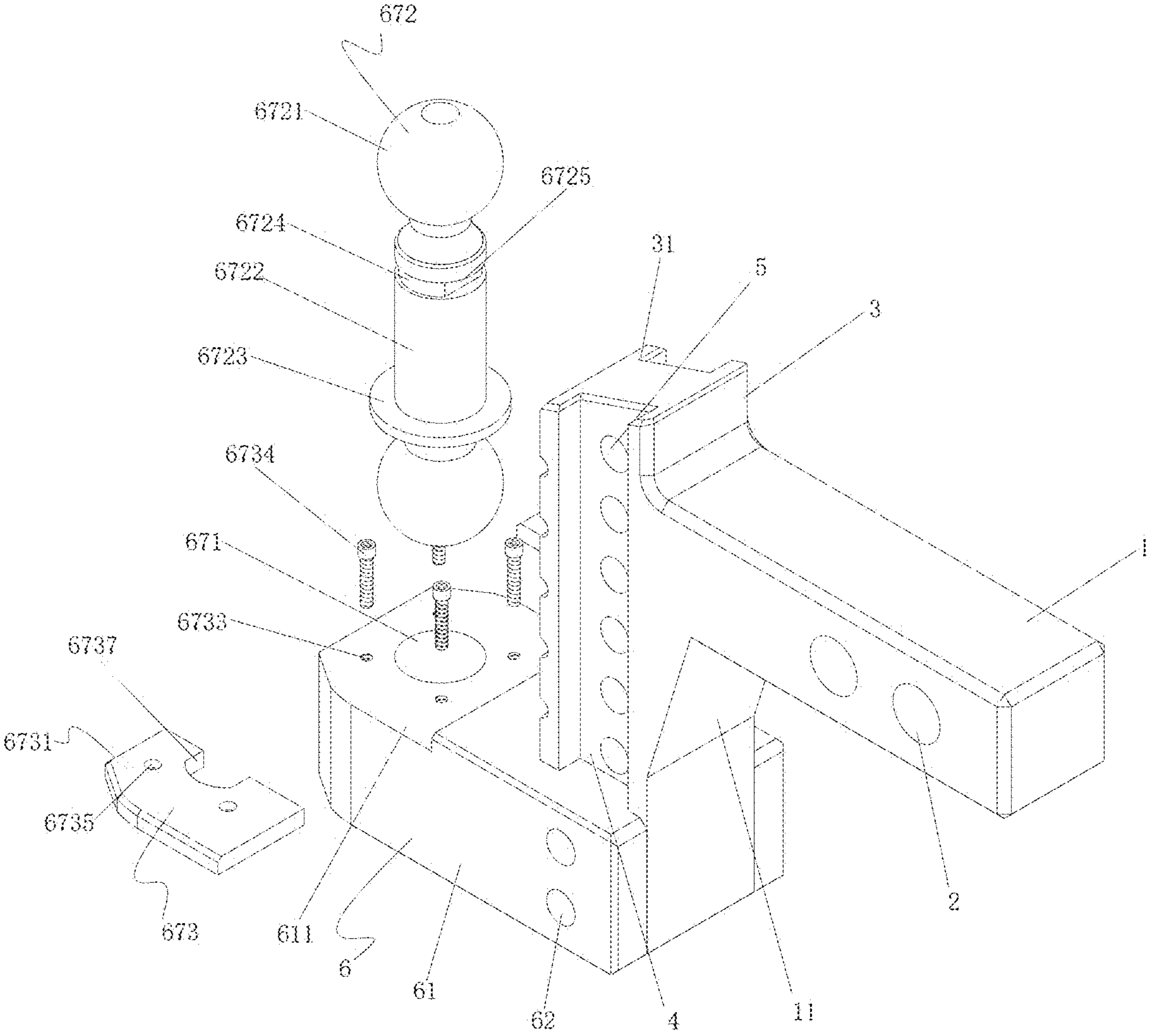
FIG. 4 is an exploded view of the invention.

Please refer to FIG. 1 to FIG. 4, the invention provides a trailer connection device with automatic height positioning, comprising a main shank 1, first pin holes 2 arranged on the main shank 1, an adjustable shank 3 perpendicular to the main shank 1 and fixedly arranged thereon, two slide grooves 4 symmetrically arranged on both sides of the adjustable shank 3, a plurality of second pin holes 5 arranged on the adjustable shank 3, and a trailer connection mechanism 6 movably arranged on the adjustable shank 3; the trailer connection mechanism 6 comprises a ball mount tongue 61 movably arranged on the two slide grooves 4, a plurality of third pin holes 62 symmetrically arranged on the ball mount tongue 61, a plurality of automatic positioning grooves 63 arranged on the adjustable shank 3, a clearance groove 64 arranged in the ball mount tongue 61, a positioning ball 65 movably arranged in the clearance groove 64, a spring 66 with two ends respectively fixed on the clearance groove 64 and the positioning ball 65, and a connecting assembly 67 arranged on the ball mount tongue 61; the plurality of second pin holes 5 are arranged linearly and equidistantly; each automatic positioning groove 63 is arranged between two adjacent second pin holes 5; the plurality of automatic positioning grooves 63 correspond one to one with the plurality of second pin holes 5.

When using this trailer connection device, insert the main shank 1 into a quick-connect square opening of the trailer and secure it with pins; move the ball mount tongue 61 to match the height of a tractor; position the positioning ball 65 into one of the automatic positioning grooves 63 to initially secure the ball mount tongue 61; align the third pin holes 62 on the ball mount tongue 61 with the two second pin holes 5 on the adjustable shank 3, and secure the ball mount tongue 61 with pins; connect the two trailer hitch balls 6721 to the tractor, thus linking the tractor and the trailer. By using this trailer connection device, the third pin holes 62 on the ball mount tongue 61 can automatically align with the second pin holes 5 on the adjustable shank 3, facilitating the adjustment of the height of the ball mount tongue 61 and completion of the fixation.

Specifically, the connecting assembly 67 comprises a through hole 671 arranged on the ball mount tongue 61, a dual ball 672 detachably arranged in the through hole 671, and a fastening hoop 673 arranged on the ball mount tongue 61 for fixing the dual ball 672.

Specifically, the dual ball 672 comprises two trailer hitch balls 6721 respectively arranged on both sides of the ball mount tongue 61, a support rod 6722 with two ends respectively fixed on the two trailer hitch balls 6721, a limit plate 6723 fixed on the support rod 6722, and a locking edge groove 6724 arranged on the support rod 6722.

Specifically, the locking edge groove 6724 is symmetrically provided with two first planes 6725.

Specifically, the fastening hoop 673 comprises a right hoop 6731 arranged on the ball mount tongue 61 and a left hoop 6732 arranged on the ball mount tongue 61; the right hoop 6731 and the left hoop 6732 have the same structure; the right hoop 6731 comprises a right hoop body 6736, screw holes 6733 arranged on the ball mount tongue 61, fastening bolts 6734 detachably arranged on the ball mount tongue 61 and cooperating with the screw holes 6733, bolt head holes 6735 arranged on the right hoop body 6736, and two second planes 6737 symmetrically arranged on the right hoop body 6736.

Specifically, the two second planes 6737 are arranged in cooperation with the two first planes 6725.

Insert the support rod 6722 into the through hole of the ball mount tongue 61, ensuring that the limit plate 6723 is tightly fitted against one side of the ball mount tongue; then, engage the right hoop 6731 and the left hoop 6732 with the locking edge groove 6724 on the support rod 6722, and secure them with fastening bolts 6734; the two second planes 6737 are configured to mate with the two first planes 6725, which restricts the relative rotation and movement between the support rod 6722 and the ball mount tongue 61; as a result, during the towing process, the two trailer hitch balls 6721 remain firmly connected to the ball mount tongue 61, ensuring the stability and safety of the trailer.

Specifically, a reinforcing rib 11 is arranged at a connection between the main shank 1 and the adjustable shank 3.

The connection between the main shank 1 and the adjustable shank 3 is subject to complex forces and stress concentration, which can easily lead to deformation or damage. The setting of reinforcing rib 11 can reduce stress concentration, improve strength and stability, and extend the service life.

Specifically, one end of the adjustable shank 3 is provided with an inclined surface 31.

The inclined surface 31 at one end of the adjustable shank 3 has a guiding function, which facilitates the installation of the ball mount tongue 61.

Specifically, the ball mount tongue 61 is provided with a step 611; the height of the step 611 is the same as the thickness of the right hoop body 6736.

The right hoop 6736 is fixed to the ball mount tongue 61 and positioned on the step 611, keeping the surface of the ball mount tongue 61 level and more aesthetically pleasing.

Specifically, this trailer connection device can be used with a 180° flip, meaning one end of the inclined surface 31 on the adjustable shank 3 can be positioned either facing up or down. Since the connection between the main shank 1 and the adjustable shank 3 is not at the center of the adjustable shank 3, the height adjustment range of the ball mount tongue is larger.

Specifically, the connecting assembly 67 is not limited to using the dual ball 672; it can also utilize trailer hitch pins or single balls.

The above descriptions are only some preferred embodiments of the invention and an explanation of the technical principles used. Those skilled in the art should understand that the scope of the invention involved in the embodiments of the invention is not limited to the technical solutions formed by the specific combination of the above technical features, but should also cover other technical solutions formed by any combination of the above technical features or their equivalent features without departing from the above concept of the invention. For example, the above features can be replaced with the technical features with similar functions provided in the embodiments of the invention (but not limited to) to form a technical solution.

The invention claimed is:

1. A trailer connection device with automatic height positioning, comprising a main shank, first pin holes arranged on the main shank, an adjustable shank perpendicular to the main shank and fixedly arranged thereon, two slide grooves symmetrically arranged on both sides of the adjustable shank, a plurality of second pin holes arranged on the adjustable shank, and a trailer connection mechanism movably arranged on the adjustable shank, wherein the trailer connection mechanism comprises a ball mount tongue movably arranged on the two slide grooves, a plurality of third pin holes symmetrically arranged on the ball mount tongue, a plurality of automatic positioning grooves arranged on the adjustable shank, a clearance groove arranged in the ball mount tongue, a positioning ball movably arranged in the clearance groove, a spring with two ends respectively fixed on the clearance groove and the positioning ball, and a connecting assembly arranged on the ball mount tongue; the plurality of second pin holes are arranged linearly and equidistantly; each automatic positioning groove is arranged between two adjacent second pin holes; the plurality of automatic positioning grooves correspond one to one with the plurality of second pin holes.

2. The trailer connection device with automatic height positioning of claim 1, wherein the connecting assembly comprises a through hole arranged on the ball mount tongue, a dual ball detachably arranged in the through hole, and a fastening hoop arranged on the ball mount tongue for fixing the dual ball.

3. The trailer connection device with automatic height positioning of claim 2, wherein the dual ball comprises two trailer hitch balls respectively arranged on both sides of the ball mount tongue, a support rod with two ends respectively fixed on the two trailer hitch balls, a limit plate fixed on the support rod, and a locking edge groove arranged on the support rod.

4. The trailer connection device with automatic height positioning of claim 3, wherein the locking edge groove is symmetrically provided with two first planes.

5. The trailer connection device with automatic height positioning of claim 4, wherein the fastening hoop comprises a right hoop arranged on the ball mount tongue and a left hoop arranged on the ball mount tongue; the right hoop and the left hoop have the same structure; the right hoop comprises a right hoop body, screw holes arranged on the ball mount tongue, fastening bolts detachably arranged on the ball mount tongue and cooperating with the screw holes, bolt head holes arranged on the right hoop body, and two second planes symmetrically arranged on the right hoop body.

6. The trailer connection device with automatic height positioning of claim 5, wherein the two second planes are arranged in cooperation with the two first planes.

7. The trailer connection device with automatic height positioning of claim 1, wherein a reinforcing rib is arranged at a connection between the main shank and the adjustable shank.

8. The trailer connection device with automatic height positioning of claim 7, wherein one end of the adjustable shank is provided with an inclined surface.

9. The trailer connection device with automatic height positioning of claim 5, wherein the ball mount tongue is provided with a step; the height of the step is the same as the thickness of the right hoop body.

* * * * *